Figure 1:
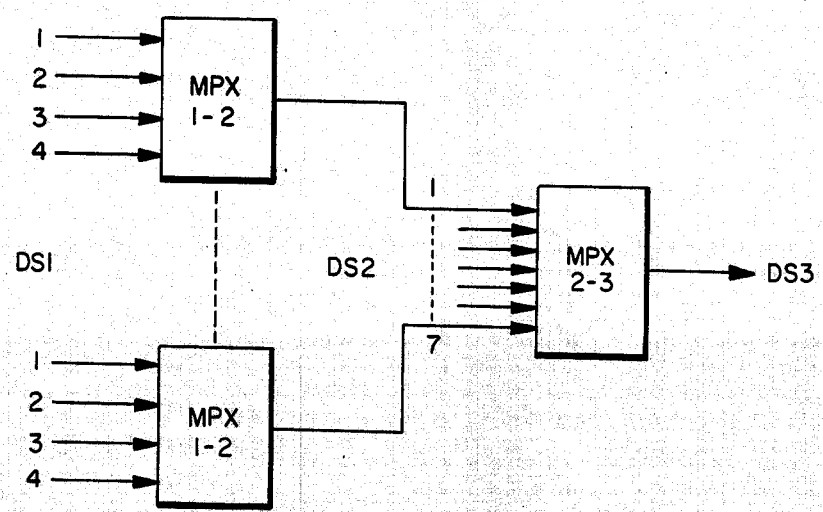

United States Patent [19]

Grover

[11] Patent Number: 4,674,088
[45] Date of Patent: Jun. 16, 1987

[54] METHOD AND APPARATUS FOR DETECTING FRAME SYNCHRONIZATION

[75] Inventor: Wayne D. Grover, Ottawa, Canada

[73] Assignee: Northern Telecom Limited, Montreal, Canada

[21] Appl. No.: 709,636

[22] Filed: Mar. 7, 1985

[51] Int. Cl.[4] .......................... H04J 3/06; H04L 7/00
[52] U.S. Cl. ................................. 370/100; 370/102; 375/116
[58] Field of Search ............... 370/100, 102, 106, 112, 370/105; 371/42, 35; 375/112, 116

[56] References Cited

U.S. PATENT DOCUMENTS

| | | | |
|---|---|---|---|
| 3,938,086 | 2/1976 | Valbonesi | 340/146.1 D |
| 4,397,017 | 8/1983 | Rokugo | 370/102 |
| 4,507,780 | 3/1985 | Perry | 370/100 |
| 4,562,574 | 12/1985 | Kambayashi | 370/100 |
| 4,567,587 | 1/1986 | McDermott | 370/100 |

*Primary Examiner*—Douglas W. Olms
*Assistant Examiner*—Curtis Kuntz
*Attorney, Agent, or Firm*—R. John Haley

[57] ABSTRACT

Frame synchronization to the frame pattern of a DS3 bit stream is achieved by detecting the framing pattern and producing a synchronizing slip in the absence of such detection. In order to avoid long frame times as a result of unconfigured adjacent DS1 transmission links producing data which mimic the DS3 framing pattern, redundantly transmitted stuff information (tributary justification control) bits are also checked to ensure that appropriate bits, relative to the position of the framing pattern bits, have expected properties (e.g. triplicated values), and a synchronizing slip is also produced if this is not the case. Short framing times are also achieved by storing in each of the framing pattern and stuff information bit detectors not only the particular bits which are currently to be checked, but also consecutive bits which are selected in dependence upon the occurrence of previous synchronizing slips.

32 Claims, 7 Drawing Figures

METHOD AND APPARATUS FOR DETECTING FRAME SYNCHRONIZATION

This invention relates to a method of and apparatus for detecting frame synchronization, and to a method of and framing circuit for achieving frame synchronization using such detection.

It is well known to provide a framing circuit to detect a framing pattern in a serial data stream, and to effect frame synchronization on the basis of this detection. Ideally, the framing pattern is easily detectable and does not occur in the remainder of the data stream; these ideals, however, are rarely met in practice as a result of other constraints, such as bandwidth limitations and the need to transmit data transparently, i.e. without limitations imposed by framing considerations. In consequence the framing time, or time-to-reframe, is of considerable importance in the framed transmission of serial data. This time, as is well known, is the time which is required in order to detect the framing pattern in the data stream and to synchronize to it, either initially or in the event of a loss of frame synchronization during transmission.

Generally, framing pattern sequences and transmission formats are selected in such a manner as to facilitate to a large extent the detection of the framing pattern. This is not the case, however, with the transmission of so-called DS1 bit streams at the so-called DS3 level. It has been recognized that in such transmission, as is explained in detail below, adjacent unconfigured DS1 transmission links produce, the DS3 bit stream, a data pattern which mimics the DS3 framing pattern. This mimicking results in unacceptably long framing times at the DS3 level.

As these long framing times are known to be caused by unequipped DS1 tributaries, one method of avoiding this problem would be to require every unconfigured DS1 tributary to be supplied with a pseudo-random pattern generator. However, this would require international co-operation and would be costly to implement, difficulties which this invention seeks to avoid.

An object of this invention, therefore, is to provide an improved method of and apparatus for detecting synchronization to frames of a serial data steam including a predetermined framing pattern.

Although the invention is particularly applicable to DS3 bit streams, it is not limited thereto.

According to one aspect of this invention there is provided a method of detecting synchronization to frames of a serial data stream including a predetermined framing pattern, comprising the steps of: detecting the framing pattern in the data stream; and detecting a predetermined characteristic of data, other than the framing pattern, having a predetermined position in the data stream relative to the framing pattern.

Conveniently the predetermined characteristic comprises the same value of a plurality of data bits which are transmitted redundantly in the data stream. For example, in a DS3 bit stream these are conveniently three stuff information (tributary justification control) bits which are transmitted redundantly and are interleaved with bits constituting the framing pattern.

The invention also provides a method of synchronizing to frames of a serial data stream including a predetermined framing pattern, comprising the steps of: detecting synchronization to said frames by the above method; producing an error signal in response to a failure to detect either the framing pattern or said predetermined characteristic in the predetermined position; and producing a synchronizing slip in dependence upon the error signal.

The method preferably includes the steps of: producing an in-frame signal in the absence of the error signal for at least a predetermined period; producing the synchronizing slip in response to each error signal in the absence of the in-frame signal; and producing the synchronizing slip and terminating the in-frame signal in response to a plurality of error signals occurring in a predetermined period in the presence of the in-frame signal.

The method desirably includes the step of producing compensation for previous synchronizing slips in detecting the framing pattern and the predetermined characteristic. This step preferably comprises the steps of: storing a plurality of successive bits of the data stream; producing at least one selection signal in dependence upon the occurrence of a synchronizing slip; and selecting one of the stored plurality of successive bits of the data stream, for detection of the framing pattern or the predetermined characteristic, in dependence upon the selection signal.

According to another aspect of this invention there is provided apparatus for detecting synchronization to frames of a serial data stream including a predetermined framing pattern and including data, having a predetermined characteristic, in a predetermined position in the data stream relative to the framing pattern, the apparatus comprising: means for detecting the framing pattern; means for detecting the predetermined characteristic of the data in the predetermined position relative to the framing pattern; and means for producing a synchronization error signal in response to said means for detecting failing to detect the framing pattern or the predetermined characteristic of the data in the predetermined relative position.

Conveniently the means for detecting the predetermined characteristic comprises means for detecting the same logic value of a plurality of bits in the predetermined relative position in the data stream.

The invention also extends to a framing circuit comprising: timing means for producing a clock signal; apparatus as recited above, said means for detecting being responsive to the clock signal; and means responsive to the error signal for controlling the timing means to change the phase of the clock signal relative to the data stream thereby to produce a synchronizing slip.

In an embodiment of the invention the timing means comprises first frequency divider means for frequency dividing a signal at the bit rate of the data stream by a first predetermined factor to produce a control signal; second frequency divider means for frequency dividing the control signal by a second predetermined factor to produce the clock signal; and means for modifying the frequency division by the first frequency divider means to frequency divide by a third predetermined factor to produce the synchronizing slip.

The means responsive to the error signal preferably comprises means for counting pulses of the clock signal in the presence and in the absence of the error signal; means for producing an in-frame signal in response to a first predetermined number of pulses of the clock signal being counted by the counting means in the absence of the error signal; means for producing a synchronizing slip command signal in reponse to the error signal in the absence of the in-frame signal; and means for producing the synchronizing slip command signal and for terminating the in-frame signal in response to the counting means counting a second predetermined number of pulses of the clock signal in the presence of the error signal within a third predetermined number of periods of the clock signal.

In order to achieve particularly rapid framing times, preferably each of the detecting means comprises means for compensating for previous synchronizing slips, each compensating means comprising: means for storing a plurality of successive bits of the data stream; means responsive to the synchronizing slip command signal for producing at least one selection signal; and means responsive to the selection signal for selecting one of the stored plurality of successive bits of the data stream for the respective detection.

Figure 3:
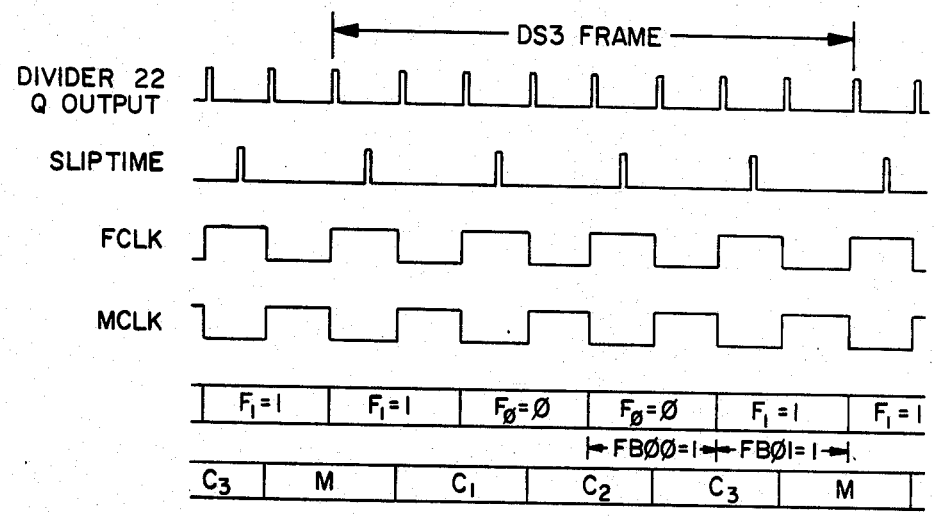
Figure 2:
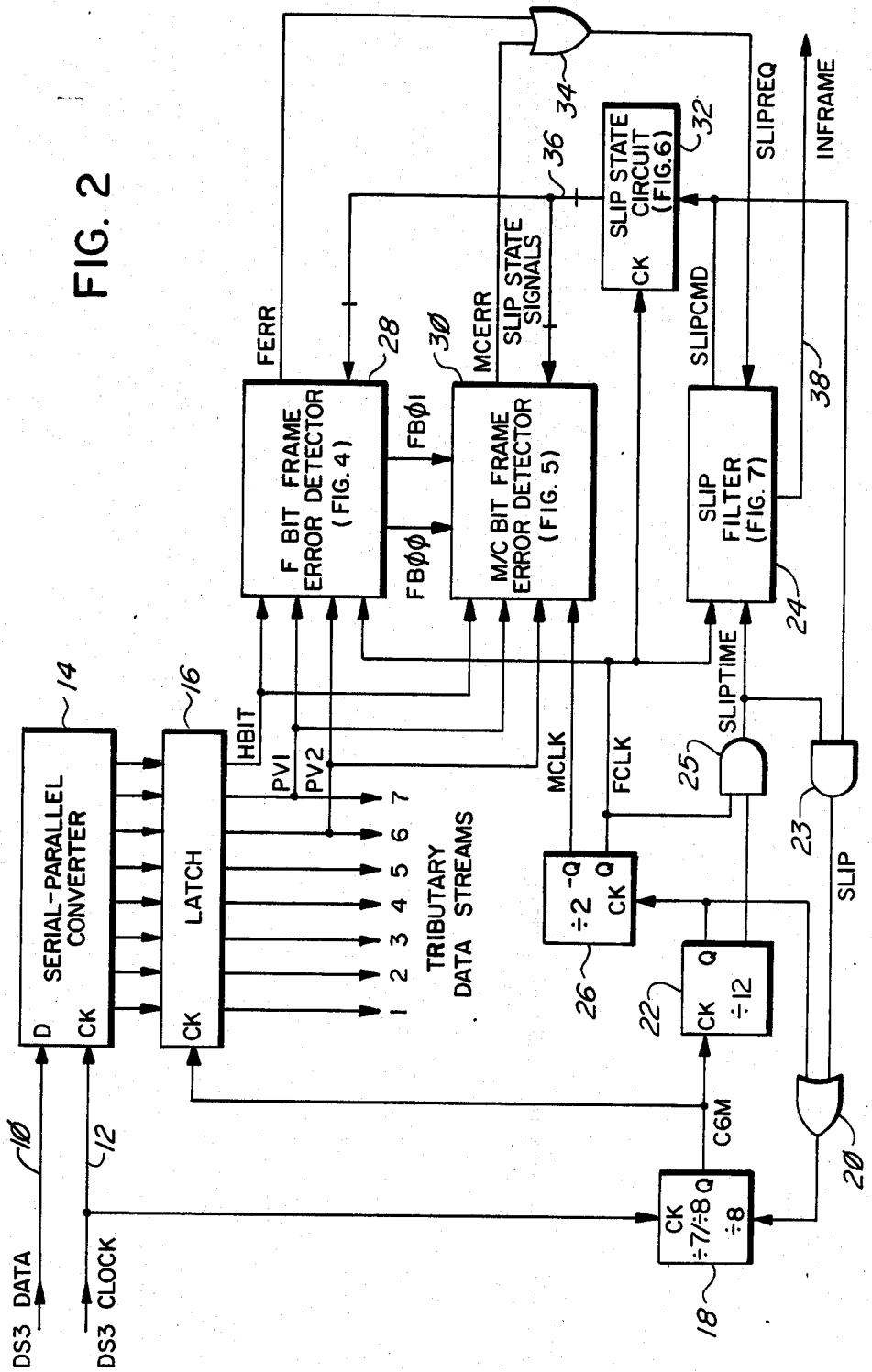

The invention will be further understood from the following description with reference to the accompanying drawings, in which:

FIG. 1 schematically illustrates a known form of multiplexing arrangement;

FIG. 2 shows a block diagram of a framing circuit in accordance with this invention;

FIG. 3, which is on the same sheet as FIG. 1, shows a timing diagram showing signals which occur in operation of the framing circuit; and FIGS. 4 to 7 show diagrams of respectively an F bit frame error detector, an M/C bit frame error detector, a slip state circuit, and a slip filter of the framing circuit of FIG. 2.

Referring to FIG. 1, there is illustrated a known form of multiplexing arrangement for multiplexing bit streams from the DS1 to the DS3 level. As is known, a DS1 bit stream consists of bits at a bit rate of 1.544 MBs, which may for example be constituted by a T1 carrier signal comprising 24 8-bit voice channel signals and associated framing bits. Four such DS1 bit streams are multiplexed together by a multiplexer MPX1-2, two of which are illustrated in FIG. 1, to produce a DS2 bit stream at a bit rate of 6.312 MB/s. Seven such DS2 bit streams are multiplexed together by a multiplexer MPX2-3 to produce a DS3 bit stream at a bit rate of 44.736 MB/s. Thus a DS3 bit stream can comprise 28 DS1 bit streams.

Each multiplexer MPX1-2 produces its DS2 bit stream by sampling its 4 inputs or tributaries sequentially 12 times, inverting every other bit, and adding a housekeeping bit. Thus if each housekeeping bit is denoted by H and the input bits for the 4 inputs are denoted X1 to X4, the DS2 bit stream has the form:

HX1X2X3X4X1X2X3X4X1X2X3X4X1X2X3X4X1-
X2X3X4X1X2X3X4X1X2X3X4
X1X2X3X4X1X2X3X4X1X2X3X4X1X2X3X4X-
1X2X3X4HX1X2X3X4 . . .

This is more conveniently expressed as:

H [(X1 X2 X3 X4)×12] H [(X1 X2 X3 X4)×12]. . .

The multiplexer MPX2-3 produces the DS3 bit stream by sampling its 7 inputs or tributaries sequentially 12 times, taking one bit from each DS2 bit stream on each sample to produce a serial stream of 84 bits to which it adds one housekeeping bit. Eight such 85-bit sequences form a frame which comprises 8 housekeeping bits, and 7 such frames form a masterframe. In each frame, the 8 housekeeping bits form the data pattern:

$M_i\ F_1\ C_{i1}\ F_0\ C_{i2}\ F_0\ C_{i3}\ F_1$ where: i = 1 to 7;
$M_i$ forms a masterframe word pattern, and is referred to below as an M bit;
$C_{i1}$, $C_{i2}$, and $C_{i3}$ are triplicated stuff/nostuff tributary control bits for the DS2 tributary i in the current masterframe, and are referred to below as C bits; and
$F_1$ and $F_0$ are respectively 1 and 0 bits forming an F bit framing pattern.

The F bit framing pattern in the DS3 bit stream, which permits frame synchronization for proper demultiplexing, thus has the sequence $F_1\ F_0\ F_0\ F_1$ in each frame. The F bit framing pattern is thus the bit sequence 1001100110011001 . . .

In the prior art, such a framing bit pattern is detected in the DS3 bit stream, and upon detection and statistical validation (i.e. the pattern persists for at least a predetermined period) the system is deemed to be in frame and demultiplexing is effected accordingly. The problem which the invention seeks to overcome arises in that adjacent unconfigured DS1 links produce bit patterns in the DS3 bit stream which mimic this framing bit pattern. A consequent result is very long reframing times.

The problem arises in that if there are two adjacent unconfigured DS1 links, i.e. adjacent inputs to a multiplexer MPX1-2 which are permanently both logic 1 or 0, each frame of the resultant DS2 bit stream produced by the multiplexer will for example have the form:

H [(1 0 X X )×12]

where X denotes an arbitrary bit derived from a DS1 bit stream, and the alternating 1 and 0 arise from the multiplexer's alternate bit inversion of the unconfigured DS1 link bits in producing the DS2 bit stream. The sampling by the multiplexer MPX1-2 of its inputs 12 times between successive DS2 housekeeping bits H, and the sampling by the multiplexer MPX2-3 of its inputs 12 times between successive DS3 housekeeping bits, has the result that there is a direct relationship between bit positions in the DS3 bit stream and the DS1 bit streams. As a result of this and the fact that the F bits of the framing bit pattern in the DS3 bit stream are searched for in alternate 85-bit sequences of the DS3 bit stream (i.e. there are four F bits in each DS3 frame), the above DS2 bit stream produces in the DS3 bit stream a pattern which, in the short term until is is disrupted by the occurrence of a DS2 housekeeping bit H, corresponds to the framing bit pattern. The detection of this mimicking framing bit pattern delays detection of the real DS3 framing bit pattern, leading to long framing times.

This situation is exacerbated with a greater number of unconfigured DS1 links. With four DS1 links unconfigured, the framing time can be 48 times as long as that for a system in which random data is present on all DS1 inputs. Such long framing times can occur in spite of the merits of the framing bit pattern itself, which enables fast framing to be achieved in the absence of the mimicking data bit patterns.

In order to avoid such long framing times, the invention utilizes a predetermined characteristic of bits in the bit stream, other than the framing bits themselves, to facilitate rapid elimination of mimicking data bit patterns from consideration as the real framing bit pattern during the framing process. In this embodiment of the invention, this predetermined characteristic is the nature of the C housekeeping bits of the DS3 bit stream.

As already described, in each DS3 frame there are three triplicated C bits, $C_1$ to $C_3$. As these are triplicated, in the absence of errors they have the property that $C_1=C_2=C_3$, i.e. the three C bits are either all 0 or all 1. Furthermore, the C bits have a fixed position in the DS3 frame relative to the F bit framing pattern. Thus the DS3 housekeeping bit sequence in each frame actually has the form:

| $M_i$ | $F_1$ | $C_{i1}$ | $F_0$ | $C_{i2}$ | $F_0$ | $C_{i3}$ | $F_1$ | |
|---|---|---|---|---|---|---|---|---|
| M | 1 | 0 | 0 | 0 | 0 | 0 | 1 | for $C_1=C_2=C_3=0$ |
| M | 1 | 1 | 0 | 1 | 0 | 1 | 1 | for $C_1=C_2=C_3=1$. | the M bit being variably 0 or 1.

From these bit patterns, it can be seen that, when framing is correct (and assuming that none of the bits are in error) two relationships hold:

(i) when the most recent two F bits are both 0, then the two most recent bits in the sequence of M and C bits must be the same because they are the C bits $C_1$ and $C_2$;

(ii) when the most recent F bit is 1 and the preceding F bit is 0, then the three most recent bits in the sequence of M and C bits must be the same because they are the three C bits in the frame.

In the framing process in accordance with this embodiment of the invention, these relationships are checked as well as the checking for the framing bit pattern itself. In the event that during the framing process one or both of these relationships is not true, even though the framing bit pattern itself appears to be correct, a bit slip is effected and hunting for the proper frame synchronization is continued. Thus in the presence of the mimicking data bit patterns described above, the checking of these relationships, when a mimicking data bit pattern is being evaluated as the framing bit pattern, rapidly shows that the pattern is not correct. In consequence, the long framing times of the prior art are avoided.

Whilst the relationships discussed above rely on the absence of any error in the C bits, it is noted that the probability of such error is very small, and is much less than the probability of mimicking data bit patterns occurring. In the unlikely event that an error does occur in the C bits during the framing process when the real framing bit pattern is being evaluated, this will merely lead to a framing time, on that isolated occasion, which is longer than normal in accordance with the invention (although not necessarily longer than occurs normally in the prior art with a similar error). It is also noted that the invention contributes to faster framing times even in the absence of mimicking data bit patterns.

FIG. 2 shows a framing circuit in accordance with this embodiment of the invention. In FIG. 2 and FIGS. 4 to 7 the following symbols in various blocks have the following meanings:

| | |
|---|---|
| D | Data Input |
| CK | Clock Input |
| Q, -Q | Output and its complement |
| D-FF | D-type flip-flop |

Referring to FIG. 2, a DS3 bit stream on a line 10 and a corresponding recovered clock signal DS3 CLOCK on a line 12 are supplied to a serial-parallel converter 14 having eight parallel outputs which are connected to inputs of an 8-bit latch 16. The signal DS3 CLOCK is also supplied to a divider 18, which normally divides by 7 but can be controlled, by a logic 1 supplied by an OR gate 20 to an input ÷8 of the divider 18, to divide by 8. The output of the divider 18 constitutes a clock signal C6M which controls the latch 16 to latch the contents of the converter 14 and produce at seven of its outputs, and hence on lines numbered 1 to 7, a bit of each of the tributary data streams at the DS2 level. An eighth output of the latch 16 produces a signal HBIT which provides the DS3 housekeeping bit stream, i.e. the M, C, and F bits, as described in greater detail below. The signal C6M is also supplied to a ÷12 divider 22 whose Q output is connected to one input of the gate 20.

The elements of the framing circuit as so far described serve to demultiplex the DS3 bit stream into its tributary DS2 bit streams and to produce the DS3 housekeeping bits as the signal HBIT, assuming that DS3 frame synchronization has already been established. Thus the divider 18 causes the DS3 bits to be properly distributed among the seven tributary DS2 data streams, and the divider 22 modifies the operation of the divider 18 so that each 85th bit, which as already described constitutes a housekeeping bit, of the DS3 bit stream is separated and produced as the signal HBIT.

In order to achieve frame synchronization, additional bit slips can be achieved by a signal SLIP which is supplied via the OR gate 20 to the ÷8 input of the divider 18. As only one such additional bit slip is desired between successive F bits of the DS3 bit stream, and as the signal SLIP would have no effect if it occurred at the same time that the Q output of the ÷12 divider 22 is 1, the signal SLIP is produced by gating in an AND gate 23 a slip command signal SLIPCMD, which is produced by a slip filter 24, with a signal SLIPTIME produced by an AND gate 25 and also supplied to the slip filter 24. The signal at the Q output of the divider 22 is supplied to a ÷2 divider 26, which produces complementary clock signals FCLK (for the F bits) and MCLK (for the M and C bits) at its outputs. The signal FCLK is supplied as one input to the gate 25; the other input is derived from a second output of the divider 22, and is high for one counting state, e.g. the 6th of the 12 states, of the divider 22.

FIG. 3 illustrates the relative timing of the signals FCLK, MCLK, and SLIPTIME and the signal at the Q output of the divider 22. FIG. 3 also illustrates the relative periods during which the respective types of DS3 housekeeping bits, shown in the synchronized state, can be evaluated.

The framing circuit also comprises an F bit frame error detector 28, an M/C bit frame error detector 30, a slip state circuit 32, and an OR gate 34. The units 24, 28, 30, and 32 are described in detail below. The general arrangement of these units and their interaction is described first.

In order to provide rapid framing, the error detectors 28 and 30 are supplied not only with the signal HBIT, comprising bits of the DS3 data stream which are being evaluated for their validity as the DS3 housekeeping bits, but also preview bit signals PV1 and PV2 from adjacent outputs of the latch 16. The signals PV1 and PV2 thus consist of bits derived from the DS3 bit stream respectively 1 and 2 bits behind (i.e. later in time than) the bits constituting the signal HBIT. In the event of one of more bit slips being effected during the framing process, the detectors 28 and 30 are controlled by slip state signals on lines 36 to use one or both of these signals PV1 and PV2 in their evaluations, without having to wait for a new sequence of potential DS3 housekeeping bits to be accumulated. In consequence, the framing process has a potential rate of four bit slips per DS3 frame (i.e. one bit slip per F bit). The slip state signals are produced by the slip state circuit 32 in response to the signal SLIPCMD which produces each bit slip.

The error detectors 28 and 30 produce error signals FERR and MCERR respectively, each of which is a logic 1 in the event of an error being detected by the respective detector. The signals are supplied to the OR gate 34 which accordingly supplies a signal SLIPREQ with a logic 1 to the slip filter 24 in the event of any error being detected. The slip filter 24 produces the signal SLIPCMD to effect a bit slip in response to the signal SLIPREQ during the framing process before frame synchronization is established. When frame synchronization is established, the slip filter 24 produces a signal INFRAME on an output line 38, and only produces the signal SLIPCMD in response to several occurrences of the signal SLIPREQ and hence several errors, in order to avoid a loss of frame synchronization due to spurious signals.

Figure 4:
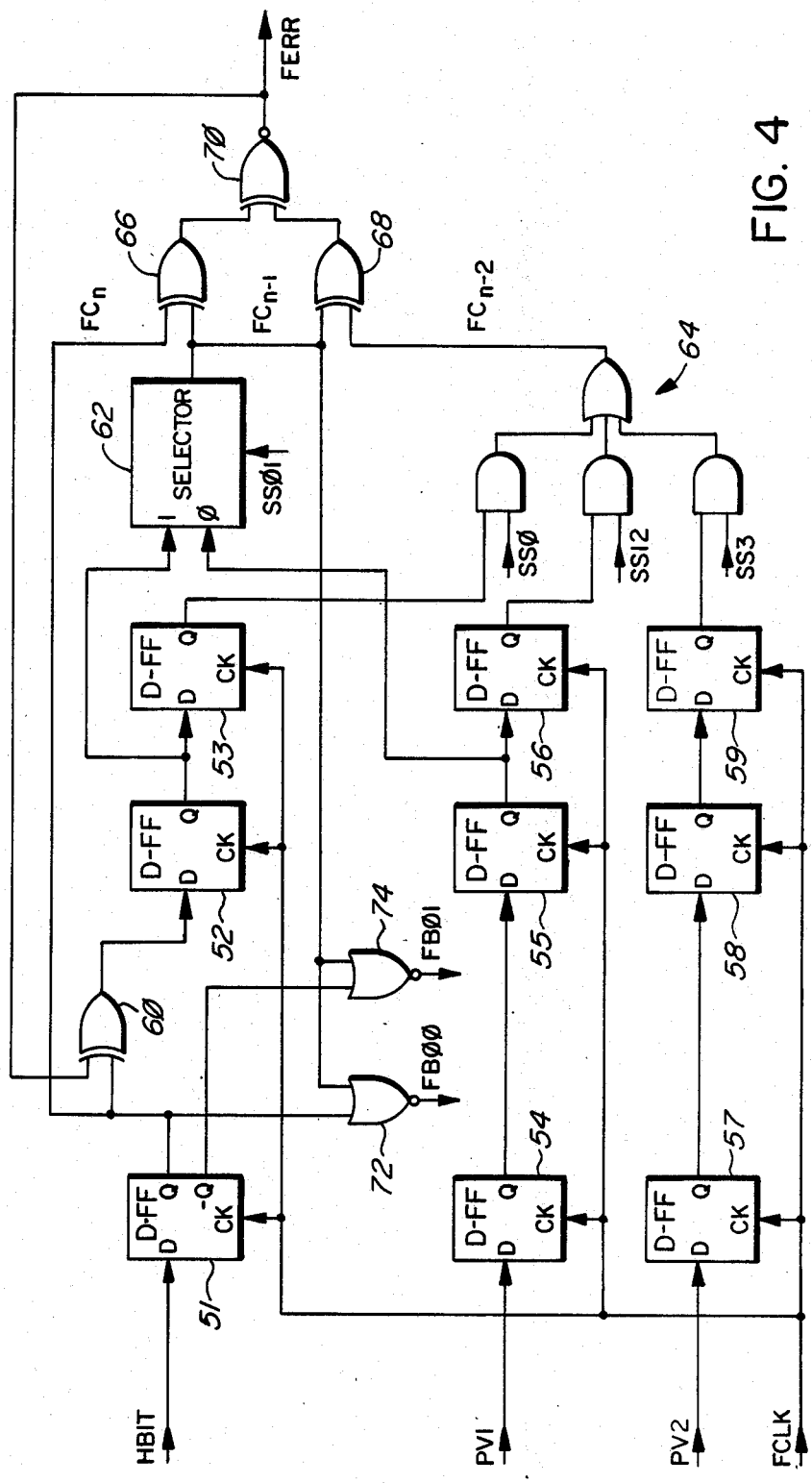
Figure 5:
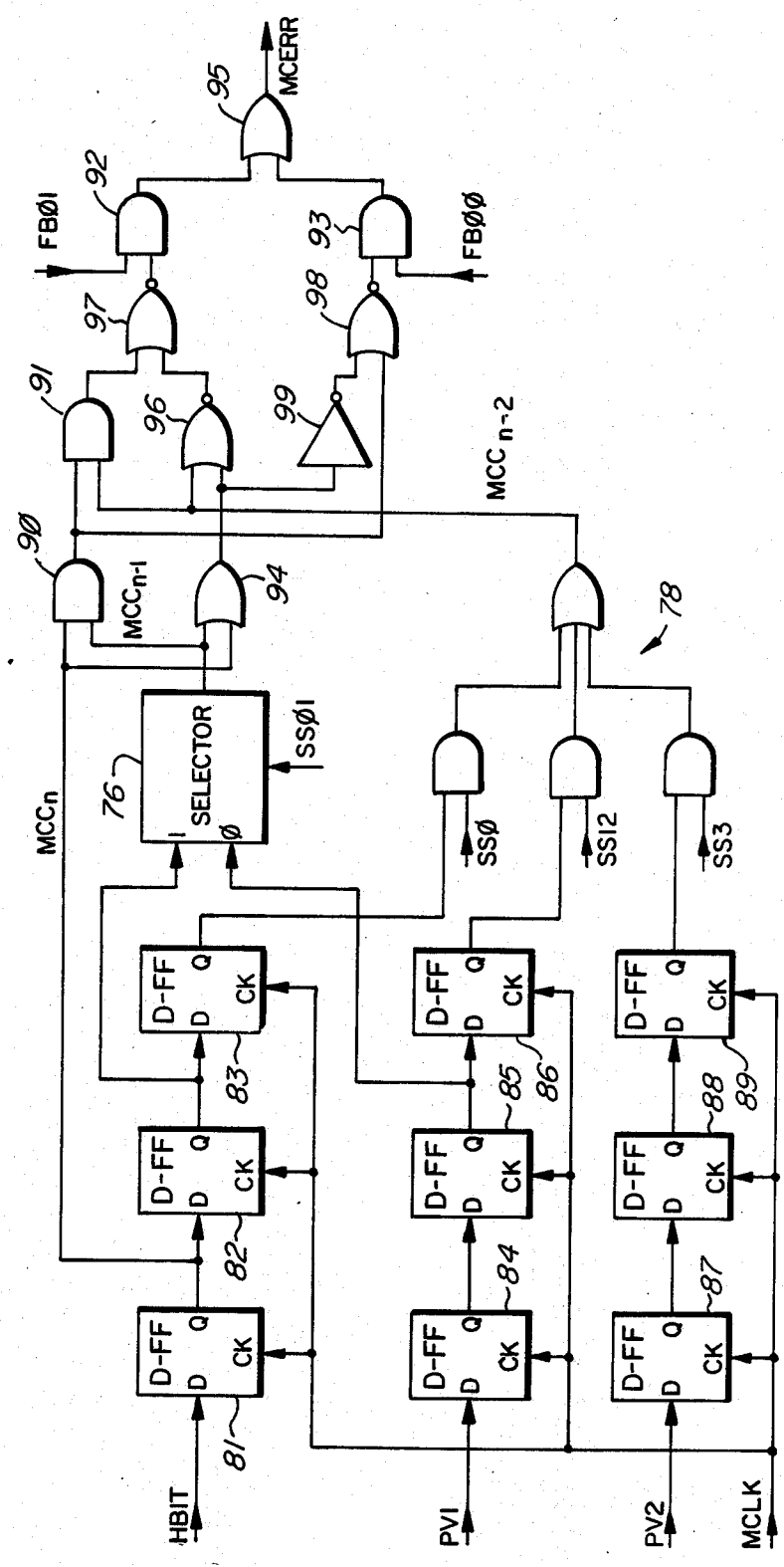

Each of the error detectors 28 and 30, shown in FIGS. 4 and 5 respectively, consists of a first part for producing candidate bits, for evaluation as DS3 housekeeping bits, which are selected in dependence upon the slip state signals to accommodate any recent bit slips which may have taken place in response to preceding evaluations, and a second part for performing the evaluation itself. In the F bit frame error detector 28 the candidate bits are constituted by signals $FC_n$, $FC_{n-1}$, and $FC_{n-2}$ representing respectively the present, previous, and next previous slip-compensated bits which are to be evaluated as F bits. Similarly, in the M/C bit frame error detector 30, the candidate bits are constituted by signals $MCC_n$, $MCC_{n-1}$, and $MCC_{n-2}$ representing respectively the present, previous, and next previous slip-compensated bits which are to be evaluated as M and C bits. As the signals $FC_n$ and $MCC_n$ represent current bits, these are not affected by the slip compensation. The previous candidate bit signals $FC_{n-1}$ and $MCC_{n-1}$ are selected in dependence upon whether no bit slip or one bit slip took place at the preceding slip time (when the signal SLIPTIME=1). The next previous candidate bit signals $FC_{n-2}$ and $MCC_{n-2}$ are selected in dependence upon whether no, one, or two bit slips took place at the last two slip times.

Figure 6:
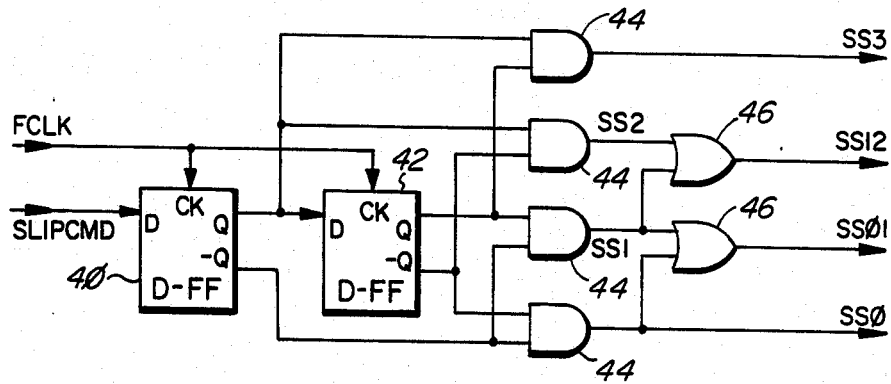

FIG. 6 illustrates the slip state circuit 32 in detail. It comprises two D-type flip-flops 40 and 42 forming a two-stage register which is clocked by the signal FCLK and supplied with data constituted by the signal SLIPCMD. The register thus stores, and is updated with, the history of the signal SLIPCMD, and hence the occurrence of bit slips in response to errors, over the last two periods between candidate DS3 housekeeping bits. The outputs of the flip-flops 40 and 42 are decoded by AND gates 44 to produce signals SS0 to SS3, some of which are combined in OR gates 46 to produce further signals SS01 and SS12. The signals SS0, SS01, SS12, and SS3 constitute the slip state signals on the lines 36. The states of the various signals in dependence upon the occurrence of bit slips is summarized in the following table:

| Previous Bit Slips | | Slip State Signals | | | |
| --- | --- | --- | --- | --- | --- |
| Last Period (D-FF 40) | Previous Period (D-FF 42) | SS0 | SS01 | SS12 | SS3 |
| No | No | 1 | 1 | 0 | 0 |
| Yes | No | 0 | 0 | 1 | 0 |
| No | Yes | 0 | 1 | 1 | 0 |
| Yes | Yes | 0 | 0 | 0 | 1 |

Referring to FIG. 4, in the first part of the F bit frame error detector 28 the signals HBIT, PV1, and PV2 are supplied to the inputs of respective 3-stage shift registers formed by D-type flip-flops 51 to 59 which are clocked by the signal FCLK. The signal $FC_n$ is constituted by the current signal HBIT latched in the flip-flop 51. This signal and the signal FERR produced by the error detector 28 are supplied to inputs of an Exclusive-OR gate 60 whose output constitutes the data input to the flip flop 52 constituting the next stage of the HBIT shift register. In dependence upon the slip select signal SS01 the output of this flip-flop 52 if there was no bit slip in the last period, or the output of the second flip-flop 55 in the PV1 shift register if there was a bit slip in the last period, is selected as the signal $FC_{n-1}$ by a selector 62. In dependence upon the other slip state signals a selector 64 formed by three AND gates and an OR gate selects as the signal $FC_{n-2}$ the output of the flip-flop 53 if there was no bit slip in either of the last two periods, the output of the flip-flop 56 if there was a bit slip in one of the last two periods, or the output of the flip-flop 59 if there were bit slips in both of the last two periods. Thus the provision of the signals PV1 and PV2 and the selection described above ensures that the candidate bits constituting the signals $FC_n$, $FC_{n-1}$, and $FC_{n-2}$ are properly selected regardless of whether or not bit slips have recently taken place.

The signals $FC_n$ and $FC_{n-1}$ are applied to the inputs of an Exclusive-OR gate 66, and the signals $FC_{n-1}$ and $FC_{n-2}$ are applied to the inputs of an Exclusive-OR gate 68. The outputs of the gates 66 and 68 are applied to inputs of an Exclusive-NOR gate 70 whose output constitutes the signal FERR. The gates 66 to 70 together serve to check for the DS3 framing bit pattern 10011001 ... in the sequence of three slip-compensated candidate bit signals $FC_n$, $FC_{n-1}$, and $FC_{n-2}$.

Because only three candidate bits $FC_n$, $FC_{n-1}$, and $FC_{n-2}$ are checked in producing the signal FERR, the Exclusive-OR gate 60 is provided to complement the output of the flip-flop 51 in response to the signal FERR=1, so that this signal FERR=1 is produced only once in response to each framing pattern candidate bit error.

In addition, the signal $FC_{n-1}$ is applied to one input of each of two NOR gates 72 and 74, second inputs of which are supplied with the signal $FC_n$ and its complement respectively from the complementary outputs of the flip-flop 51. The outputs of these gates constitute signals FB00 and FB01 which are supplied, as shown in FIG. 2, to the M/C bit frame error detector 30. The signal FB00 or FB01 is a logic 1 if the current and previous slip-compensated candidate F bits have the sequence 00 or 01 respectively.

Referring to FIG. 5, the first part of the M/C bit frame error detector 30 generally corresponds to the first part of the F bit frame error detector 28, and serves a similar purpose. In this or detector D-type flip-flops 81 to 89 are clocked by the signal MCLK, and selectors 76 and 78 select the signals $MCC_{n-1}$ and $MCC_{n-2}$ respectively in dependence upon the slip state signals in a similar manner to that described above.

The slip-compensated M/C candidate bits $MCC_n$, $MCC_{n-1}$, and $MCC_{n-2}$ are processed in dependence upon the signals FB00 and FB01, by a logic array comprising AND gates 90 to 93, OR gates 94 and 95, NOR gates 96 to 98, and an inverter 99, to produce the signal MCERR.

As already described and as can be seen from FIG. 3, if the signal FB00 is a logic 1, i.e. if the current and preceding F candidate bits are both 0, then the current and preceding MC candidate bits should be the bits C1 and C2 and should be equal. The gate 90 produces a 1 output if the signals $MCC_n$ and $MCC_{n-1}$ are both 1, and the gate 94 produces a 0 output, so that the inverter 99 produces a 1 output, if these signals are both 0. If neither of these situations holds, the gate 98 has 0 at both of its inputs so that it produces a 1 output, which is passed by the gate 93 enabled by the signal FB00 and by the OR gate 95 to produce the signal MCERR.

Similarly, if the signal FB01 is a logic 1, i.e. if the preceding and current F candidate bits form the sequence 01, then as shown in FIG. 3 the current and preceding two MC candidate bits should be the bits $C_1$, $C_2$, and $C_3$ and should all be equal. The gate 91 produces a 1 output if the signals $MCC_n$, $MCC_{n-1}$, and $MCC_{n-2}$ are all 1, and the gate 96 produces a 1 output if these signals are all 0. If neither of these situations holds, the gate 97 has 0 at both of its inputs so that it produces a 1 output, which is passed by the gate 92 enabled by the signal FB01 and by the OR gate 95 to produce the signal MCERR.

Thus the two relationships described above are checked, and if these do not hold for the prevailing candidate bits then the signal MCERR is produced with a logic 1 to produce the signal SLIPREQ via the OR gate 34, whereby a bit slip is triggered during the framing process even though the F bit frame error detector 28 may not have detected any error in the pattern of candidate F bits which it is checking.

Figure 7:
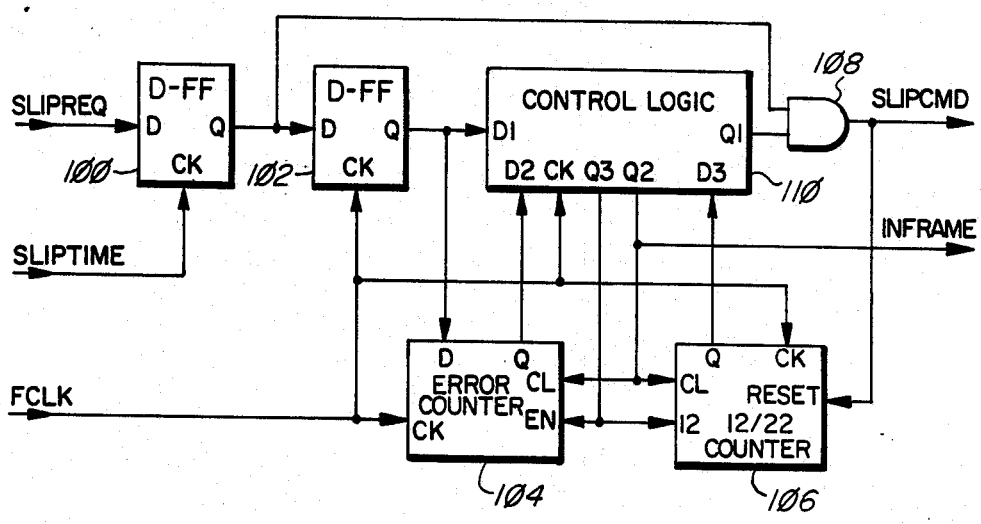

FIG. 7 shows the slip filter 24, which comprises two D-type flip-flops 100 and 102, an error counter 104, a programmable counter 106, an AND gate 108, and a control logic circuit 110 having data inputs D1, D2, and D3 and outputs Q1, Q2, and Q3, the outputs Q1 and Q2 being complementary to one another.

The signal SLIPREQ, produced by the gate 34 in the event of an error detected as described above, is clocked through the flip-flop 100 by the signal SLIPTIME. The resulting signal is applied to one input of the gate 108, and is also clocked through the flip-flop 102 by the signal FCLK, the Q output of the flip-flop 102 constituting an error signal and being applied to the input D1 of the control logic circuit 110 and to the D input of the error counter 104. The Q1 output of the circuit 110 is connected to another input of the gate 108, whose output constitutes the signal SLIPCMD and is also connected to a reset input of the counter 106. The output Q2 of the circuit 110 constitutes the signal INFRAME and is also connected to clear inputs CL of the counters 104 and 106. An enable input EN of the error counter 104 is connected to the Q3 output of the circuit 110; when this input is a logic 1 the error counter 104 is enabled to count, under the control of the signal FCLK, error signals supplied to its D inputs, and on reaching a count of 3 it supplies a signal via its Q output to the input D2 of the circuit 110. The counter 106 counts pulses of the signal FCLK when it is not cleared or reset via its input CL or RESET respectively. On reaching a count of 12 if the signal applied from the Q3 output of the circuit 110 to its input 12 is a logic 1, or on reaching a count of 22 if this input signal is a logic 0, the counter 106 supplies a signal via its Q output to the input D3 of the circuit 110.

Before frame synchronization is established, the circuit 110 produces at its outputs Q1 to Q3 logic levels 1, 0, and 0 respectively, so that the AND gate 108 is enabled and the counter 106 is set to count to 22. Each signal SLIPREQ is thus passed by the gate 108 to produce the signal SLIPCMD, which produces a bit slip and resets the counter 106 to a count of 0. If 22 cycles of the signal FCLK occur without an error occurring the counter 106 reaches a count of 22 and supplies a signal to the input D3 of the circuit 110. Frame synchronization is deemed to have been established by this error-free condition, and accordingly the circuit 110 produces at its outputs Q1 to Q3 logic levels 0, 1, and 0 respectively. Thus the gate 108 is inhibited, the signal INFRAME is produced, and the counters 104 and 106 are cleared each to a count of 0. Additional gating circuitry, which is not shown for the sake of clarity in the drawings, provides that the counters 104 and 106 are cleared by the output signal Q2=1 of the circuit 110 only when its output Q3 is logic 0. The signal Q3=1 from the circuit 110 over-rides the clear signal applied to these counters so that they can count up from 0 as described below.

If an error subsequently occurs, producing the signal SLIPREQ, the D1 input of the circuit 110 is supplied with a logic 1, in response to which the circuit 110 produces at its outputs Q1 to Q3 logic levels 0, 1, and 1 respectively. Thus the signal INFRAME is unchanged, but the counter 104 is enabled and the counter 106 is controlled to count to 12. This constitutes a frame-loss-checking state which persists until either the counter 104 reaches a count of 3 or the counter 106 reaches a count of 12. If the former occurs first, as a result of the signal supplied to its input D2 the control logic circuit 110 deems that frame synchronization has been lost and returns to its initial state in which the gate 108 is enabled to re-establish frame synchronization. If the latter occurs first, as a result of the signal supplied to its input D3 the circuit 110 determines that one or more spurious errors have occurred and that frame synchronization has been maintained, in which case it returns to its second state in which it confirms the signal INFRAME and clears the counters 104 and 106.

It should be appreciated that the counts of 3, 12, and 22 described above are given by way of example only, and other counts mawy be used depending on statistical considerations. Indeed, the whole form of the slip filter 24 may be changed radically, the above embodiment of this being described here only in order to ensure completeness of the description of an overall framing circuit.

It should also be noted that the auxiliary characteristic of the data which is examined in order to avoid false framing, or to speed up the framing process, may be either a fixed logical function requirement, as in the embodiment of the invention described above, or in general any useful statistical property of the data in the predetermined position(s).

Numerous and extensive other modifications, variations, and adaptations may be made to the described embodiment without departing from the scope of the invention as defined by the claims.

What is claimed is:

1. A method of synchronizing to frames of a serial data stream including a predetermined framing pattern, comprising the steps of:
    detecting the framing pattern in the data stream;
    detecting a predetermined characteristic of data, other than the framing pattern, having a predetermined position in the data stream relative to the framing pattern;
    producing an error signal in response to a failure to detect either the framing pattern or said predetermined characteristic in the predetermined position; and
    changing the phase of a clock signal relative to the data stream, thereby to produce a synchronizing slip, in dependence upon the error signal.

2. A method as claimed in claim 1 wherein the predetermined characteristic comprises a predetermined relationship among a plurality of data bits which are transmitted redundantly in the data stream.

3. A method as claimed in claim 2 wherein the redundantly transmitted plurality of data bits comprise three bits all having the same value in each frame.

4. A method as claimed in claim 2 wherein the redundantly transmitted plurality of data bits are interleaved with bits constituting the framing pattern.

5. A method as claimed in claim 2 wherein the redundantly transmitted plurality of data bits comprise a plurality of stuff information bits in the serial data stream.

6. A method as claimed in claim 1 and including the steps of:
    producing an in-frame signal in the absence of the error signal for at least a predetermined period;
    producing the synchronizing slip in response to each error signal in the absence of the in-frame signal; and
    producing the synchronizing slip and terminating the in-frame signal in response to a plurality of error signals occurring in a predetermined period in the presence of the in-frame signal.

7. A method as claimed in claim 6 and including the step of providing compensation for previous synchronizing slips in detecting the framing pattern and the predetermined characteristic.

8. A method as claimed in claim 1 and including the step of providing compensation for previous synchronizing slips in detecting the framing pattern and the predetermined characteristic.

9. A method as claimed in claim 8 wherein the step of providing compensation for previous synchronizing slips in detecting each of the framing pattern and the predetermined characteristic comprises the steps of:
    storing a plurality of successive bits of the data stream;
    producing at least one selection signal in dependence upon the occurrence of a synchronizing slip; and
    selecting one of the stored plurality of successive bits of the data stream, for detection of the framing pattern or the predetermined characteristic, in dependence upon the selection signal.

10. A framing circuit, for synchronizing to frames of a serial data stream including a predetermined framing pattern and including data, having a predetermined characteristic, in a predetermined position in the data stream relative to the framing pattern, comprising:
    timing means for producing a clock signal;
    means for detecting the framing pattern;
    means for detecting the predetermined characteristic of the data in the predetermined position relative to the framing pattern;
    means for producing a synchronization error signal in response to said means for detecting failing to detect the framing pattern or the predetermined characteristic of the data in the predetermined relative position; and
    means responsive to the error signal for controlling the timing means to change the phase of the clock signal relative to the data stream thereby to produce a synchronizing slip.

11. A framing circuit as claimed in claim 10 wherein the means for detecting the predetermined characteristic comprises means for detecting a predetermined relationship among a plurality of bits in the predetermined relative position in the data stream.

12. A framing circuit as claimed in claim 10 wherein the timing means comprises:
    first frequency divider means for frequency dividing a signal at the bit rate of the data stream by a first predetermined factor to produce a control signal;
    second frequency divider means for frequency dividing the control signal by a second predetermined factor to produce the clock signal; and
    means for modifying the frequency division by the first frequency divider to frequency divide by a third predetermined factor in dependence upon the clock signal;
    wherein the means responsive to the error signal for controlling the timing means comprises means for causing the first frequency divider means to frequency divide by the third predetermined factor to produce the synchronizing slip.

13. A framing circuit as claimed in claim 12 wherein the first, second, and third frequency division factors are respectively 7, 12, and 8.

14. A framing circuit as claimed in claim 10 wherein the means responsive to the error signal comprises:
    means for counting pulses of the clock signal in the presence and in the absence of the error signal;
    means for producing an in-frame signal in response to a first predetermined number of pulses of the clock signal being counted by the counting means in the absence of the error signal;
    means for producing a synchronizing slip command signal in response to the error signal in the absence of the in-frame signal; and
    means for producing the synchronizing slip command signal and for terminating the in-frame signal in response to the counting means counting a second predetermined number of pulses of the clock signal in the presence of the error signal within a third predetermined number of periods of the clock signal.

15. A framing circuit as claimed in claim 10 wherein each of the detecting means comprises means for compensating for previous synchronizing slips.

16. A framing circuit as claimed in claim 15 wherein, in each of the detecting means, the means for compensating for previous synchronizing slips comprises:
    means for storing a plurality of successive bits of the data stream;
    means responsive to the error signal for producing at least one selection signal in dependence upon the occurrence of a synchronizing slip; and means responsive to the selection signal for selecting one of the stored plurality of successive bits of the data stream for the respective detection.

17. A framing circuit as claimed in claim 16 wherein each of the detecting means comprises means for compensating for previous synchronizing slips, each compensating means comprising:
    means for storing a plurality of successive bits of the data stream;
    means responsive to the synchronizing slip command signal for producing at least one selection signal; and
    means responsive to the selection signal for selecting one of the stored plurality of successive bits of the data stream for the respective detection.

18. A framing circuit as claimed in claim 17 wherein the means for detecting the framing pattern is responsive to a sequence of at least three bits of the data stream for detecting said pattern, and wherein the means for storing a plurality of successive bits of the data stream in this detecting means comprises means for storing at least three successive bits of the data stream in respect of each of at least three bits of said sequence.

19. A framing circuit as claimed in claim 18 wherein the means for detecting the predetermined characteristic of the data in the predetermined relative position in the data stream is responsive to a sequence of three bits of the data stream for detecting said characteristic, and wherein the means for storing a plurality of successive bits of the data stream in this detecting means comprises means for storing at least three successive bits of the data stream in respect of each of the three bits of said sequence.

20. A framing circuit as claimed in claim 19 wherein the means for detecting the predetermined characteristic comprises means for detecting the same logic value of the three bits of said sequence.

21. A method of synchronizing to frames of a serial data stream including a predetermined framing pattern, comprising the steps of:
    detecting the framing pattern in the data stream;
    producing an error signal in response to a failure to detect the framing pattern;
    changing the phase of a clock signal relative to the data stream, thereby to produce a synchronizing slip, in dependence upon the error signal; and
    providing compensation for previous synchronizing slips in detecting the framing pattern.

22. A method as claimed in claim 21 wherein the step of providing compensation comprises the steps of:
    storing a plurality of successive bits of the data stream;
    producing at least one selection signal in dependence upon the occurrence of a synchronizing slip; and
    selecting one of the stored plurality of successive bits of the data stream, for detection of the framing pattern, in dependence upon the selection signal.

23. A method as claimed in claim 21 and including the steps of:
    producing an in-frame signal in the absence of the error signal for at least a predetermined period;
    producing the synchronizing slip in response to each error signal in the absence of the in-frame signal; and
    producing the synchronizing slip and terminating the in-frame signal in response to a predetermined plurality of error signals occurring in a predetermined period in the presence of the in-frame signal.

24. A method as claimed in claim 22 and including the steps of:
    producing an in-frame signal in the absence of the error signal for at least a predetermined period;
    producing the synchronizing slip in response to each error signal in the absence of the in-frame signal; and
    producing the synchronizing slip and terminating the in-frame signal in response to a predetermined plurality of error signals occurring in a predetermined period in the presence of the in-frame signal.

25. A framing circuit, for synchronizing to frames of a serial data stream including a predetermined framing pattern, comprising:
    timing means for producing a clock signal;
    means responsive to the clock signal for detecting the framing pattern in the data stream;
    means for producing a synchronization error signal in response to the detecting means failing to detect the framing pattern; and
    means responsive to the error signal for controlling the timing means to change the phase of the clock signal relative to the data stream thereby to produce a synchronizing slip;
    wherein the detecting means comprises means for compensating for previous synchronizing slips.

26. A framing circuit as claimed in claim 25 wherein the timing means comprises:
    first frequency divider means for frequency dividing a signal at the bit rate of the data stream by a first predetermined factor to produce a control signal;
    second frequency divider means for frequency dividing the control signal by a second predetermined factor to produce the clock signal; and
    means for modifying the frequency division by the first frequency divider means to frequency divide by a third predetermined factor in dependence upon the clock signal;
    wherein the means responsive to the error signal for controlling the timing means comprises means for causing the first frequency divider means to frequency divide by the third predetermined factor to produce the synchronizing slip.

27. A framing circuit as claimed in claim 26 wherein the first, second, and third frequency division factors are respectively 7, 12, and 8.

28. A framing circuit as claimed in claim 25 wherein the means for compensating for previous synchronizing slips comprises:
    means for storing a plurality of successive bits of the data stream;
    means responsive to the error signal for producing at least one selection signal in dependence upon the occurrence of a synchronizing slip; and
    means responsive to the selection signal for selecting one of the stored plurality of successive bits of the data stream for the detection of the framing pattern.

29. A framing circuit as claimed in claim 28 wherein the detecting means is responsive to a sequence of at least three bits the data stream for detecting the framing pattern, and wherein the means for storing a plurality of successive bits of the data stream comprises means for storing at least three successive bits of the data stream in respect of each of the at least three bits of said sequence.

30. A framing circuit as claimed in claim 25 wherein the means responsive to the error signal comprises:

means for counting pulses of the clock signal in the presence and in the absence of the error signal;

means for producing an in-frame signal in response to a first predetermined number of pulses of the clock signal being counted by the counting means in the absence of the error signal;

means for producing a synchronizing slip command signal in response to the error signal in the absence of the in-frame signal; and means for producing the synchronizing slip command signal and for terminating the in-frame signal in response to the counting means counting a second predetermined number of pulses of the clock signal in the presence of the error signal within a third predetermined number of periods of the clock signal.

31. A framing circuit as claimed in claim 30 wherein the means for compensating for previous synchronizing slips comprises:

means for storing a plurality of successive bits of the data stream;

means responsive to the synchronizing slip command signal for producing at least one selection signal; and means responsive to the selection signal for selecting one of the stored plurality of successive bits of the data stream for the detection of the framing pattern.

32. A framing circuit as claimed in claim 31 wherein the detecting means is responsive to a sequence of at least three bits of the data stream for detecting the framing pattern, and wherein the means for storing a plurality of successive bits of the data stream comprises means for storing at least three successive bits of the data stream in respect of each of the at least three bits of said sequence.

* * * * *